G. O. SCHNELLER.
Corset-Springs.
No. 140,733. Patented July 8, 1873.
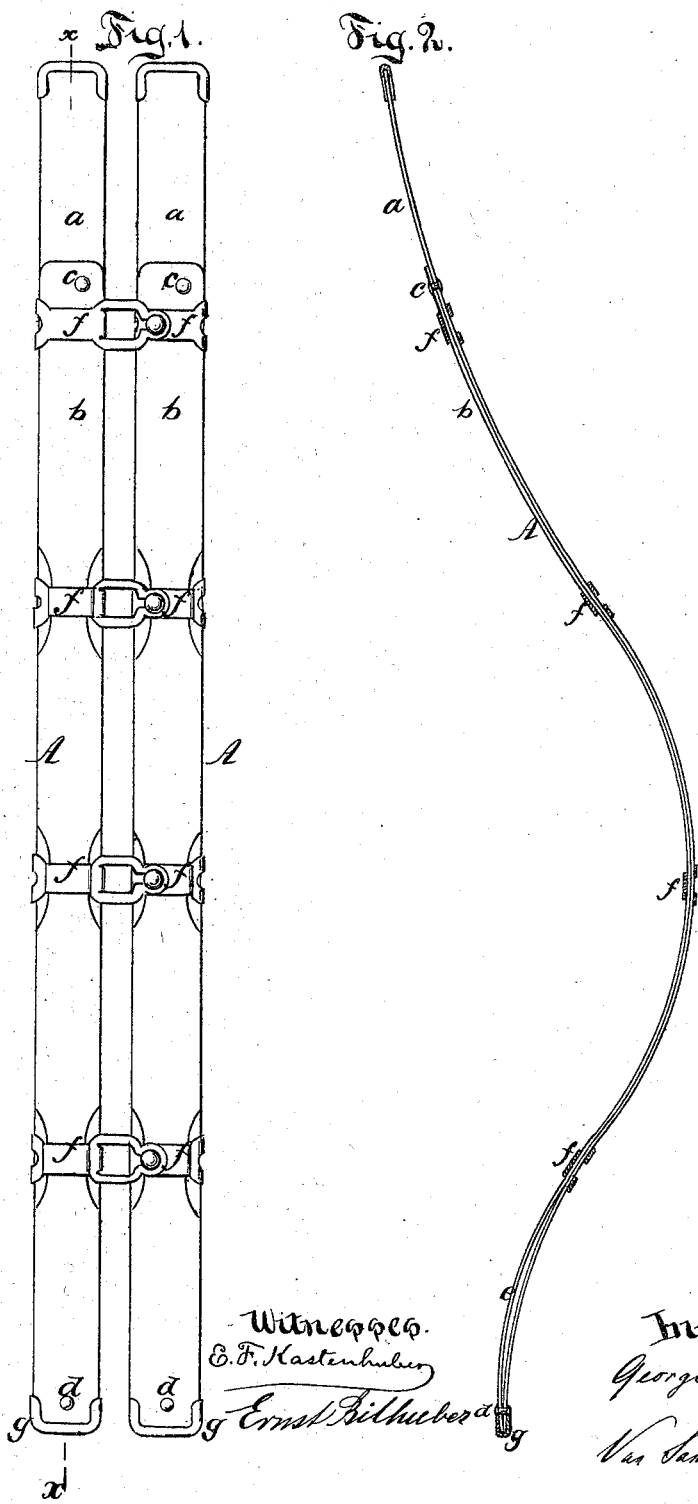

UNITED STATES PATENT OFFICE.

GEORGE O. SCHNELLER, OF ANSONIA, CONNECTICUT.

IMPROVEMENT IN CORSET-SPRINGS.

Specification forming part of Letters Patent No. 140,733, dated July 8, 1873; application filed April 16, 1873.

*To all whom it may concern:*

Be it known that I, GEORGE OTTO SCHNELLER, of Ansonia, in the county of New Haven and the State of Connecticut, have invented a new and useful Improvement in Corset-Springs; and I do hereby declare the following to be a full, clear, and exact description which will enable those skilled in the art to make and use the same, reference being had to the accompanying drawing forming part of this specification, in which drawing—

Figure 1 represents a front view of my corset-steel. Fig. 2 is a longitudinal section thereof in the plane $x\ x$, Fig. 1.

Similar letters indicate corresponding parts.

This invention consists in a corset-spring composed of two leaves, which are firmly connected at more than one point, one point being near the extreme end at the part bearing on the stomach in such a manner that when the spring is bent the auxiliary leaf is strained in the direction of its length, and thereby the elasticity of my spring is materially increased. With the two leaves fastened together as above described are combined shouldered clasps, which overlap the edges of the two leaves, so as to retain the same in the proper relation toward each other when the spring is bent and while the auxiliary leaf is strained in the direction of its length.

In the drawing, the letters A A designate a pair of corset steels or springs, each of which is composed of two or more blades of metal or other flexible and elastic material. In the drawing I have shown springs each of which is composed of two leaves, *a b*, the auxiliary leaf *b* being somewhat shorter than the main leaf *a'*, and connected to the same by two or more rivets, *c d*, so that the ends of said auxiliary leaf are prevented from sliding on the main leaf. One of the points of fastening *d* is situated near the extreme end of the spring, and, instead of using a rivet for connecting the two leaves, if desired the two leaves may also be united by a cap, *g;* or this cap may be used in connection with the rivet *d*.

That part of the main leaf of my spring which is situated at the upper end when the spring is in use projects some distance beyond the auxiliary leaf, so as to preserve a large degree of flexibility; but the point *d*, where the two leaves are fastened together, is situated at that part which bears on the stomach when the spring is in use, and which does not require a great degree of flexibility.

By securing the two leaves together, as above described, the auxiliary leaf, when the spring is bent as shown in Fig. 2, is strained in the direction of its length, as will be readily seen from the fact that the auxiliary leaf springs away from the main leaf, as seen at *e* in Fig. 2; and, by this longitudinal strain of the auxiliary leaf, the elasticity of my spring is materially increased; and, furthermore, my springs have superior firmness at the part bearing on the stomach, and less toward the upper part, or the part bearing on the breast, and the greatest flexibility at the center.

Between the points *c d*, where the two leaves are fastened together, I apply clasps *f*, which overlap the edges of the two leaves, so as to keep them in the proper relation to each other.

I am aware that the ends of the main leaf of a corset-spring have been bent around so as to form hooks to receive and confine the ends of the auxiliary leaf; but such I do not claim, since the bending of said ends destroys the elasticity and usefulness of the same; and, furthermore, the auxiliary leaf is left free to slip out of its place sidewise, no connecting rivets being used.

In the patent granted me December 31, 1872, the main and auxiliary leaf are formed from a single piece of metal; but such is not, in the strictest sense, a practical corset-spring, since the bending of the metal destroys its elasticity; therefore I disclaim the patent of A. Bennett, dated November 9, 1869; and also the patent of G. O. SCHNELLER, dated December 31, 1872.

What I claim as new, and desire to secure by Letters Patent, is—

1. The auxiliary leaf *b*, fastened at its lower end to the lower end of the main leaf by a rivet, *d*, and, at its upper end, by a rivet, *c*, to the main leaf near its upper end, as shown, so as to leave a free end to the said main leaf, substantially as described.

2. The clasp *f*, in combination with the main leaf and auxiliary leaf, when the said leaves are combined and fastened together by rivets *c d*, as herein shown and described, for the purpose specified.

Witnesses:    GEO. O. SCHNELLER.
J. C. HOTCHKISS,
VERRENICE MUNGER.